United States Patent Office 2,732,742
Patented Jan. 31, 1956

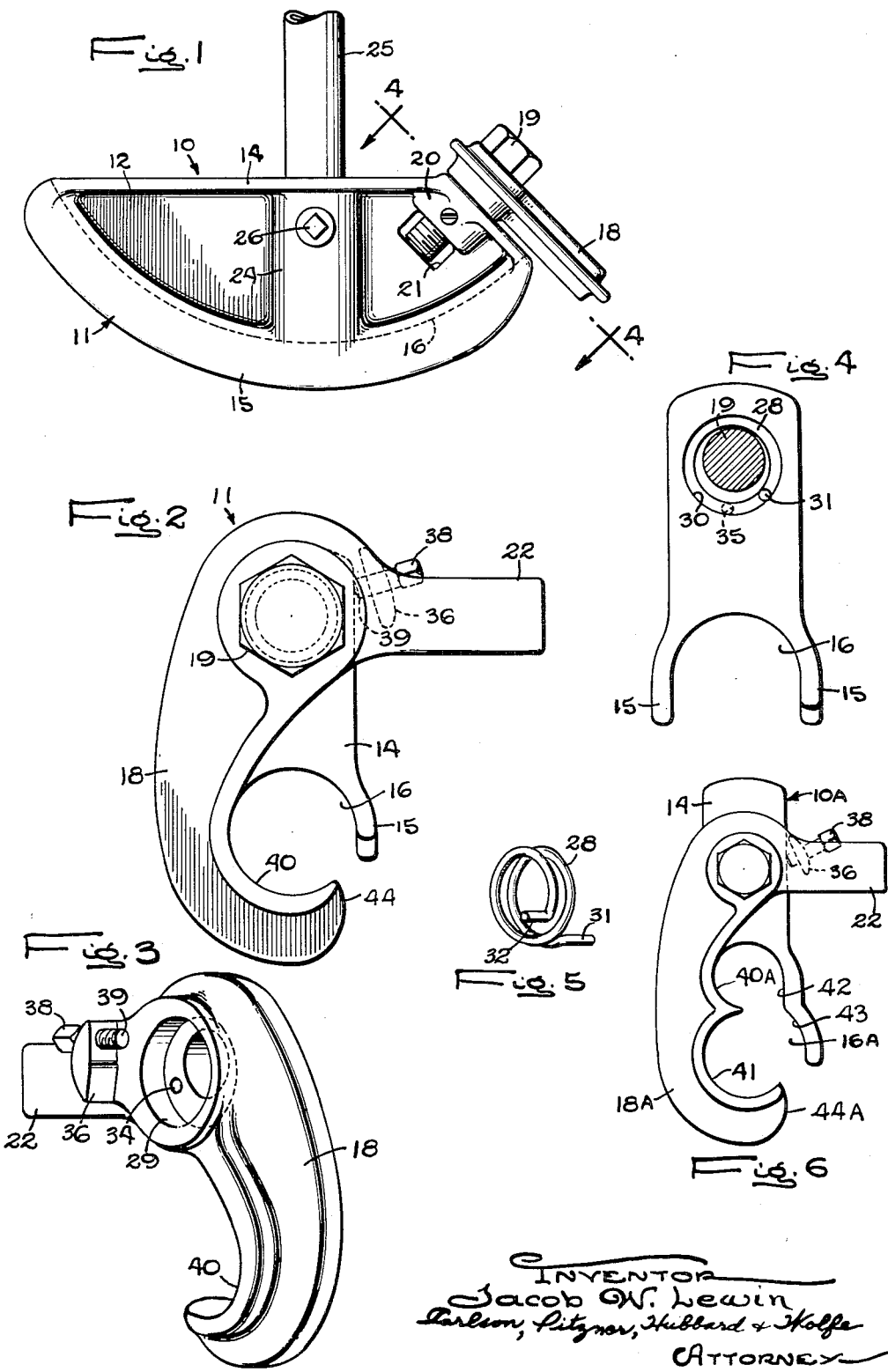

2,732,742
AUTOMATIC GRIPPING PIPE BENDER

Jacob W. Lewin, Oak Park, Ill.; Lillie E. Lewin, administratrix of said Jacob W. Lewin, deceased Application September 13, 1951, Serial No. 246,441

1 Claim. (Cl. 81—15)

The instant application is a continuation-in-part of my co-pending application Serial No. 53,656, filed October 9, 1948, and now abandoned.

The present invention pertains generally to devices for bending pipe by hand and more specifically to a novel and improved pipe bender of the character disclosed in my U. S. Patent No. 2,381,064 issued on August 7, 1945. Pipe benders embodying the present invention find particular but by no means exclusive utility in connection with the bending of electrical conduit.

One of the objects of the invention is to provide a pipe bender of the above type which will be simpler and more convenient to use than other hand benders available heretofore.

Another object is to provide a pipe bender of the foregoing character which will readily accommodate pipe or conduit of different external diameters.

A further object is to provide a pipe bender of rugged yet extremely simple construction and which will be susceptible of economical manufacture.

Other objects and advantages will become apparent as the following detailed description proceeds, taken in connection with the accompanying drawings wherein:

Fig. 1 is a side elevation of a pipe bender embodying the invention.

Fig. 2 is an enlarged elevation of the hook end of the bender of Fig. 1.

Fig. 3 is an enlarged perspective view of the retaining hook of the bender shown in Fig. 1.

Fig. 4 is an enlarged sectional view through the bender of Fig. 1, such view being taken in the plane of the line 4—4.

Fig. 5 is an enlarged perspective view detailing the spring incorporated into the device of Fig. 1.

Fig. 6 is an end view of a slightly modified pipe bender also embodying the present invention.

While the invention is susceptible of various modifications and alternative constructions, certain preferred embodiments have been shown in the drawings and will be described below in considerable detail. It should be understood, however, that there is no intention to limit the invention to the specific forms disclosed, but on the contrary, the intention is to cover all modifications and alternative constructions falling within the spirit and scope of the invention as expressed in the appended claim.

Referring more specifically to Fig. 1 the invention is there exemplified in an illustrative pipe bender 10 somewhat similar to the one shown in my prior patent referred to above. The bender 10 comprises a generally segment-shaped body 11 comprising a central web portion 12 bordered by a perpendicular edge flange 14 and a pair of spaced-apart laterally curved flanges 15 running along the curved edge of the web. The flanges 15 thus define an arcuate trough 16 for receiving a section of pipe or conduit to be bent by means of the device 10. Adjacent one end of the trough 16, the body 11 is equipped with a pipe retaining hook 18 for holding the pipe in the trough 16 during a bending operation. The hook 18 is secured to the body 11 as by means of pivot screw 19 which permits the hook to rock transversely across the trough 16 upon an axis which is substantially parallel to a tangent to the trough at the hook end thereof. To receive the screw 19, the body 11 may be provided with a boss 20 located just inside the flange 14 and having a suitably tapped bore therein terminating at a cut-out 21 in the web 12. Running radially outward from the pivotal axis of the hook 18 and integral therewith is a relatively short arm 22 for actuating the same. In order to turn the bender 10 through the necessary angle to bend a section of pipe, or to support the bender when a section of pipe is bent around the same, the web portion 12 is enlarged as at 24 so as to define a socket extending radially relative to the arc of the trough 16. The socket is of appropriate diameter and depth to receive a handle 25 which is positively retained therein as by means of a set screw 26.

Provision is made for yieldably urging the hook 18 toward its operative or pipe engaging position. This is preferably accomplished by the use of spring means interposed between the hook 18 and the body 11. In the present instance, such means comprises a helical torsion spring 28 disposed in surrounding relation upon the pivot screw 19 and completely housed within an enlarged bore 29 inside the hook 18 and a similar bore 30 alined therewith and located inside the boss 20 of the body 11. The spring 28 has oppositely extending ends 31, 32 which are respectively connected to the hook 18 and the body 11 as by engagement with holes 34, 35. By reason of the foregoing arrangement, the spring 28 is completely enclosed making it impossible for dirt or chips to enter and impede its action.

Means is provided for selectively defining the limits of arcuate movement of the hook 18. This is accomplished in the present instance by the use of a single adjustable stop means between the hook 18 and the body 11. Referring more particularly to Figs. 2 and 3, such means preferably comprises a lug 36 projecting outwardly from the general plane of the hook 18 and having a tapped hole therein for receiving an adjusting screw 38. The latter extends substantially radially inward toward the pivotal axis of the hook 18. With angular movement of the hook 18, the innermost end 39 of the screw 38 is accosted by flange 14 of the body 11. This action can occur at two different angular positions of the hook, such positions being the limits of the latter's arcuate movement. The angular distance between these limits can, of course, be varied by turning the screw 38 inwardly or outwardly with respect to the pivotal axis of the hook 18. This permits the operative position of the hook to be properly defined for the section of pipe to be bent, at the same time making it possible to compensate for variations in diameter between different sections of pipe.

In operation, the section of pipe to be bent can be seated in the trough 16 of the bender 10 simply by manipulating the bender or the pipe to press the side of the pipe against an abutment 44, defined on the free end of the hook 18, to displace the hook against the force of the spring 28 away from its normal position registering with the trough 16. The pipe is slid radially into the uncovered trough by a continuation of the single motion of the pipe relative to the bender 10 which serves at the outset to uncover the trough. As soon as the pipe drops into the trough 16, the hook 18 immediately snaps back into registry with the trough under action of the spring 28 to latch the pipe in position for a pipe bending operation. It will be appreciated that by virtue of this automatic action of the spring 28 in moving the hook 18 into latching relation with the pipe to be bent, the workman is not required to use one hand to manipulate the hook in the course of fitting a section of pipe in the bender. Thus, he has both hands free to apply to the bender handle and to the work. Consequently, the physical strain on the workman in carrying out a bending operation is minimized and the production efficiency realized from the use of the novel bender is substantially increased as compared to the results realized from the use of prior benders requiring hand operation of hooks comparing to the hook 18 of the instant bender. Upon completion of a bending operation, the arm 22 is actuated to pivot the hook 18 out of overlapping relation to the bent pipe, thereby releasing the pipe from the bender. Alternatively, the pipe can be removed from the bender by sliding it along the trough 16 out from under the hook 18.

Turning now to Fig. 6, the invention is there embodied in a slightly modified pipe bender 10A sometimes referred to in the trade as a "double duty" bender. By this expression is meant that the bender 10A will accommodate pipe of two substantially different diameters, the bender being provided with a trough 16A defining two radially spaced, generally concentric, arcuate grooves 42, 43. As shown, the groove 42 is formed to have a relatively small lateral or transverse curvature for seating pipe of the smaller diameter and the groove 42 is formed with a larger transverse curvature for seating the larger diameter pipe. By the same token, the hook 18A is fashioned with two distinct pipe engaging surfaces 40A, 41. The adjustable stop arrangement, 36, 38, and 39, previously described in connection with the bender 10 finds particular utility in this modified form of the bender 10A in that it is operable for terminating the return swinging movement of the hook 18A at selected pipe engaging positions registering with either one of the grooves 42, 43, to accommodate the bender to pipes of different diameters. The bender 10A is, of course, equipped with the biasing spring 28 for the hook 18A, the spring coacting with the hook in the manner described in connection with the bender 10 to achieve an automatic operation of the hook as an incident to loading a section of pipe into the bender. The hook 18A defines an abutment surface 44A on the free end thereof which is the counterpart of the abutment surface 44 on the hook 18 of Figs. 1 and 2.

I claim as my invention:

A pipe bender of the class described comprising, in combination, a body member including an arcuate trough defining two radially spaced, generally concentric, outwardly open arcuate grooves for bending pipe of different diameters, pivot means on said body member at one end of said trough and defining a pivotal axis located in offset relation to and in substantially parellel alinement with tangents to adjacent portions of said grooves, a pipe retaining hook pivotally mounted on said pivot means for arcuate swinging movement about said pivotal axis, adjustable stop means associated with said hook and said body member and selectively operable for terminating swinging movement of said hook in one direction at a pipe engaging position registering with either selected one of said grooves, a resilient spring interconnected between said hook and said body and stresses to continuously bias said hook toward said pipe engaging position, and said hook defining an abutment at the outer end thereof adapted to coact with a pipe to be bent to pivot said hook against the force of said spring into an inoperative position out of registration with said selected groove to permit seating of the pipe therein, said spring serving to automatically shift said hook back into said pipe engaging position upon seating of the pipe into said selected groove.

References Cited in the file of this patent

UNITED STATES PATENTS

| | | |
|---|---|---|
| 329,221 | Schramm | Oct. 27, 1885 |
| 419,270 | Low | Jan. 14, 1890 |
| 988,656 | Peck | Apr. 4, 1911 |
| 1,119,694 | Harvie | Dec. 1, 1914 |
| 1,276,596 | Vivarttas | Aug. 20, 1918 |
| 2,381,064 | Lewin | Aug. 7, 1945 |